M. & W. P. BALES.
Corn Harvester.
No. 77,708. Patented May 12, 1868.
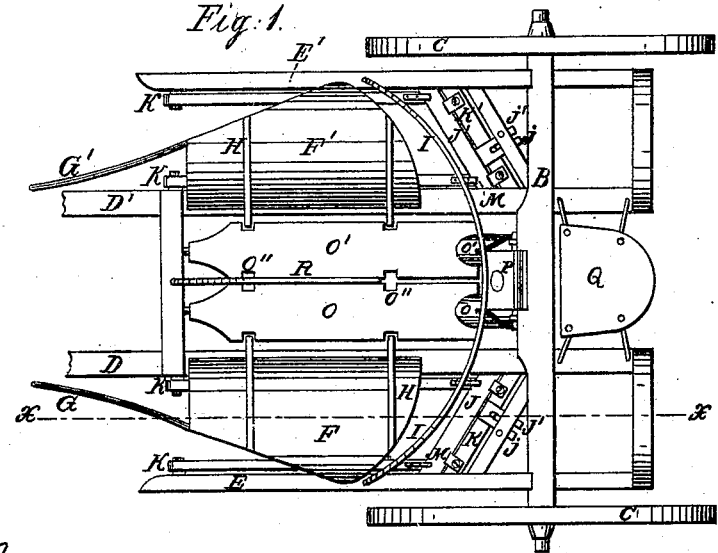
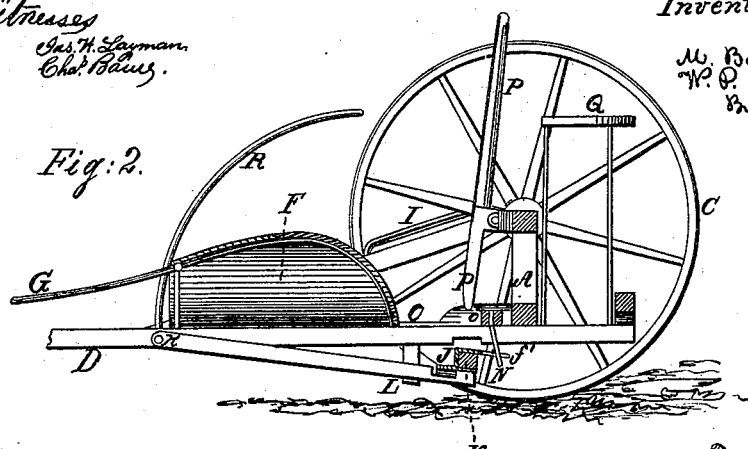
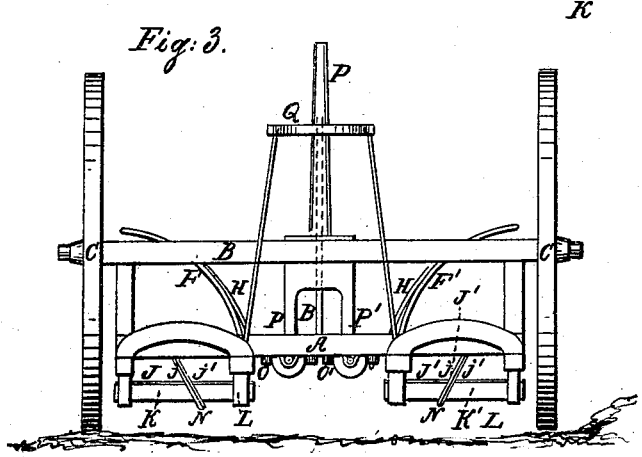
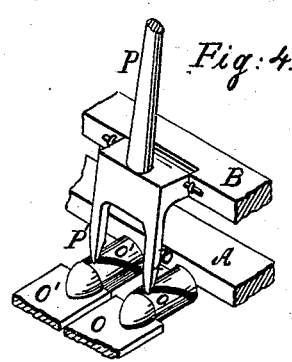
N. PETERS, Photo-Lithographer, Washington, D. C.

UNITED STATES PATENT OFFICE.

MOSES BALES AND WILLIAM P. BALES, OF LONDON, OHIO.

IMPROVEMENT IN CORN-HARVESTERS.

Specification forming part of Letters Patent No. 77,708, dated May 12, 1868.

*To all whom it may concern:*

Be it known that we, MOSES BALES and WILLIAM P. BALES, of London, Madison county, and State of Ohio, have invented a certain new and useful Corn-Harvester; and do hereby declare the following to be a full, clear, and exact description thereof, reference being had to the accompanying drawings, making part of this specification.

This invention relates to a machine adapted to be drawn over the ground by horse or other animal power, for the purpose of harvesting Indian corn.

Figure 1 is a top view of a corn-harvester embodying our improvements. Fig. 2 is a longitudinal section in the line $x\ x$. Fig. 3 is a rear elevation. Fig. 4 is a perspective view of the discharging mechanism.

Depending from and rigidly attached to the axle B of a pair of ground-wheels, C, is the frame A, having two shafts or thills, D D', designed to pass between two consecutive rows of corn, and two dividers or gatherers, E E', designed to pass outside of said rows. The corn having entered between the said thills and gatherers on either side, is both spread and deflected outwardly by the wings or spreaders F F', which consist of two plates rigidly attached to the frame, from which they rise and curve outwardly, and terminate in a convex curve, and are armed in front with tines G G' in the manner shown.

H are fingers, which, projecting downwardly and inwardly from the spreaders, serve to direct and guide the severed corn onto the platform.

Attached to both the gatherers is a curved bar, I, which, in conjunction with the spreaders F F', serves to hold the stalks of corn for the action of the knives or sickles J J', which sickles are mounted in the represented oblique position in two pivoted frames, K K', hinged at $k$, by their front ends, to the main frame, and restricted in their vertical plane at their rear ends by yokes L.

Each sickle is confined in guides M upon its respective pivoted frame, and has two rearwardly-projecting lips, $j\ j'$, between which extends, obliquely downward from the frame, a rigid tongue, N, so that, as the gravitating frame is carried upward by the pressure of the corn-stalks, the knife shall be drawn lengthwise with a carving cut, so as the more effectually and easily to sever them. The stalks, being thus severed, drop forward and are conducted by the wings F F' onto a platform, composed of two flaps, O O', pivoted longitudinally to the frame, and having at their rear ends zigzag grooves $o\ o'$ to receive the prongs $p\ p'$ of a dumping or discharging lever, P, placed conveniently to the driver's seat Q, the flaps O O' having notches $o''$ to receive the lower ends of the fingers.

A rod, R, which curves upward and rearward from the front of the frame, catches the stalks and conducts them to a longitudinal position upon the platform.

The various gathering, holding, and severing devices above described may be used either in conjunction with each other or otherwise, and with the described or any other suitable form of dumping-platform. For example, the flaps of the latter may be hinged to the thills, and may be restored to their horizontal position by a spring or counterpoise and held by a releasable catch.

We claim herein as new and of our invention—

1. The arrangement of gatherers E E', spreaders F F', curved bar I, and central platform O O', for the purpose set forth.
2. The oblique sickles J J', lips $j\ j'$, oblique tongue N, and pivoted frames K K', combined and operating in the manner explained.
3. The pivoted platform O O' in the described combination with the discharging-lever P, arranged and operating as set forth.
4. The curved guide or rod R in the described combination with the gatherers E E', spreaders F F', curved bar I, and platform O O', for the purpose specified.

In testimony of which invention we hereunto set our hands.

MOSES BALES.
    WILLIAM P. BALES.

Witnesses:
 GEO. H. KNIGHT,
 JAMES H. LAYMAN.